United States Patent
Lim et al.

(10) Patent No.: US 9,001,708 B2
(45) Date of Patent: Apr. 7, 2015

(54) METHOD IN WHICH A MOBILE TERMINAL TRANSMITS/RECEIVES A SIGNAL USING A PREDETERMINED TDD FRAME STRUCTURE IN A WIRELESS COMMUNICATION SYSTEM

(75) Inventors: Dong Guk Lim, Anyang-si (KR); Young Soo Yuk, Anyang-si (KR); Jian Xu, Anyang-si (KR); Han Gyu Cho, Anyang-si (KR); Jin Young Chun, Anyang-si (KR); Jin Sam Kwak, Anyang-si (KR)

(73) Assignee: LG Electronics Inc., Seoul (KR)

( * ) Notice: Subject to any disclaimer, the term of this patent is extended or adjusted under 35 U.S.C. 154(b) by 442 days.

(21) Appl. No.: 13/393,198

(22) PCT Filed: Aug. 30, 2010

(86) PCT No.: PCT/KR2010/005846
§ 371 (c)(1),
(2), (4) Date: May 9, 2012

(87) PCT Pub. No.: WO2011/025333
PCT Pub. Date: Mar. 3, 2011

(65) Prior Publication Data
US 2012/0230231 A1 Sep. 13, 2012

Related U.S. Application Data

(60) Provisional application No. 61/237,707, filed on Aug. 28, 2009, provisional application No. 61/238,696, filed on Sep. 1, 2009.

(30) Foreign Application Priority Data

Aug. 30, 2010 (KR) .......................... 10-2010-0084098

(51) Int. Cl.
H04J 3/00 (2006.01)
H04B 7/26 (2006.01)
H04L 5/14 (2006.01)

(52) U.S. Cl.
CPC ............ *H04B 7/2656* (2013.01); *H04B 7/2606* (2013.01); *H04L 5/1469* (2013.01)

(58) Field of Classification Search
None
See application file for complete search history.

(56) References Cited

U.S. PATENT DOCUMENTS

| 2005/0153721 | A1 | 7/2005 | Chang |
| 2008/0070582 | A1* | 3/2008 | Cai ................................ 455/450 |
| 2008/0159217 | A1 | 7/2008 | Chang et al. |
| 2010/0165954 | A1* | 7/2010 | Lin et al. ........................ 370/335 |
| 2011/0158196 | A1* | 6/2011 | Power et al. ................... 370/329 |

FOREIGN PATENT DOCUMENTS

| KR | 10-2009-0026890 | 3/2009 |
| WO | 03/032512 | 4/2003 |

* cited by examiner

*Primary Examiner* — Minh-Trang Nguyen
(74) *Attorney, Agent, or Firm* — Lee, Hong, Degerman, Kang & Waimey

(57) ABSTRACT

The mobile station for transceiving signals using a predetermined time division duplex (TDD) frame structure in a wireless communication system includes a receiver for receiving a midamble from a base station (BS), and a relay station (RS). The receiver receives, from the BS, a first midamble through a second subframe of a downlink access zone of the BS and/or through a first subframe of a downlink relay zone that follows the downlink access zone. Alternatively, the receiver receives, from the RS, a second midamble through a second subframe of a downlink access zone of the RS. A transition gap in a downlink region is located in the last subframe of the downlink access zone of the RS, which follows the downlink access zone of the RS, and a transition gap in an uplink region is located in a first subframe of an uplink relay zone of the RS.

8 Claims, 8 Drawing Sheets

FIG. 3
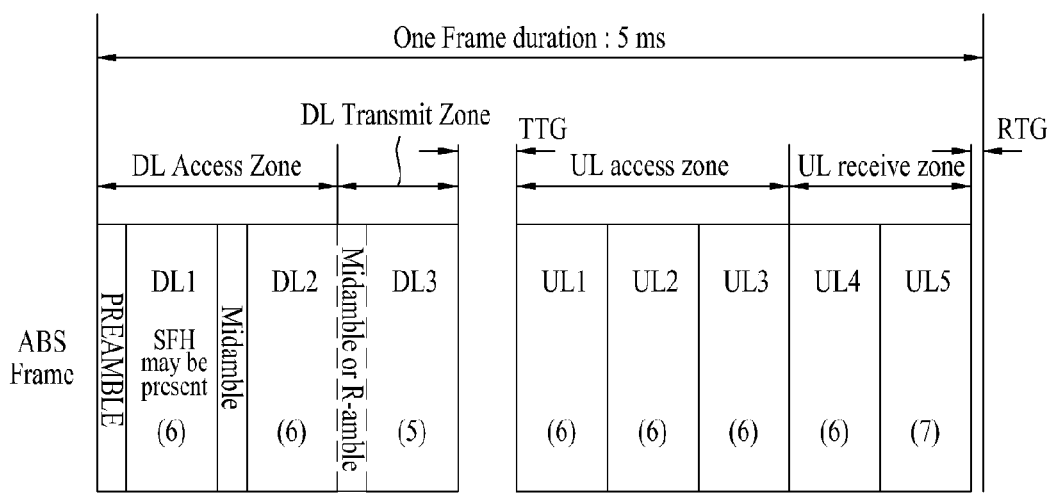
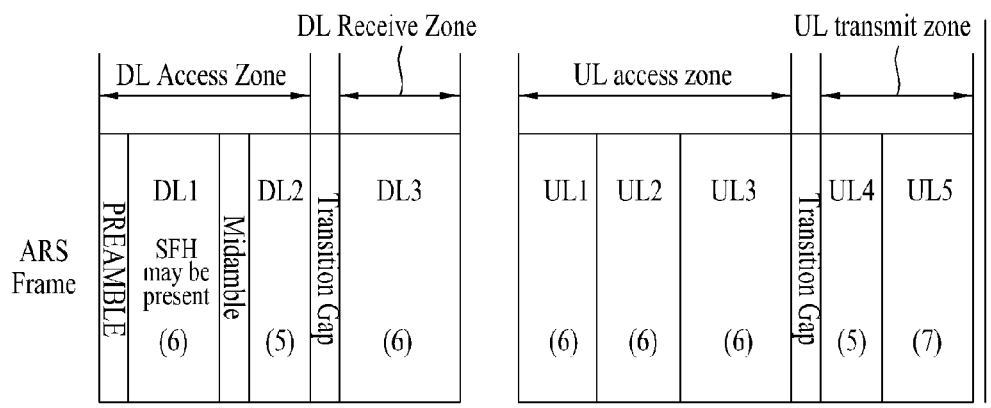

FIG. 4
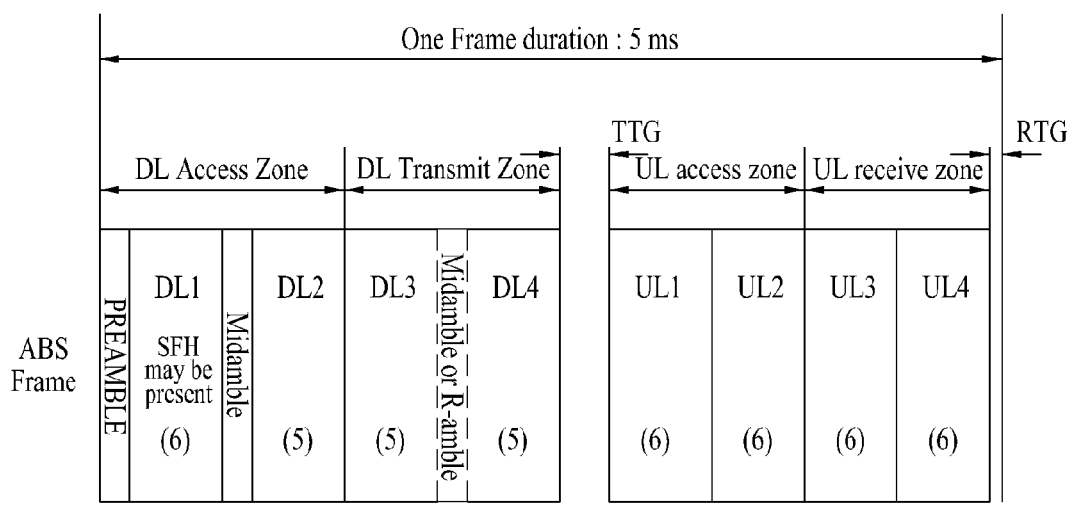
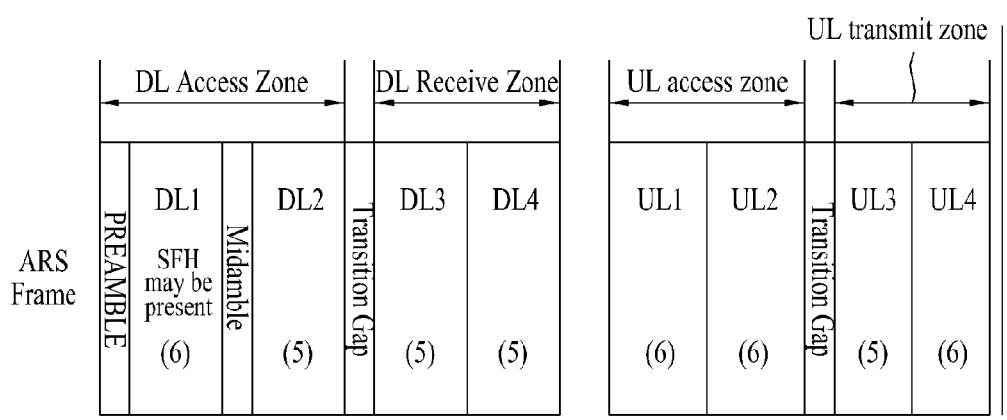

FIG. 6
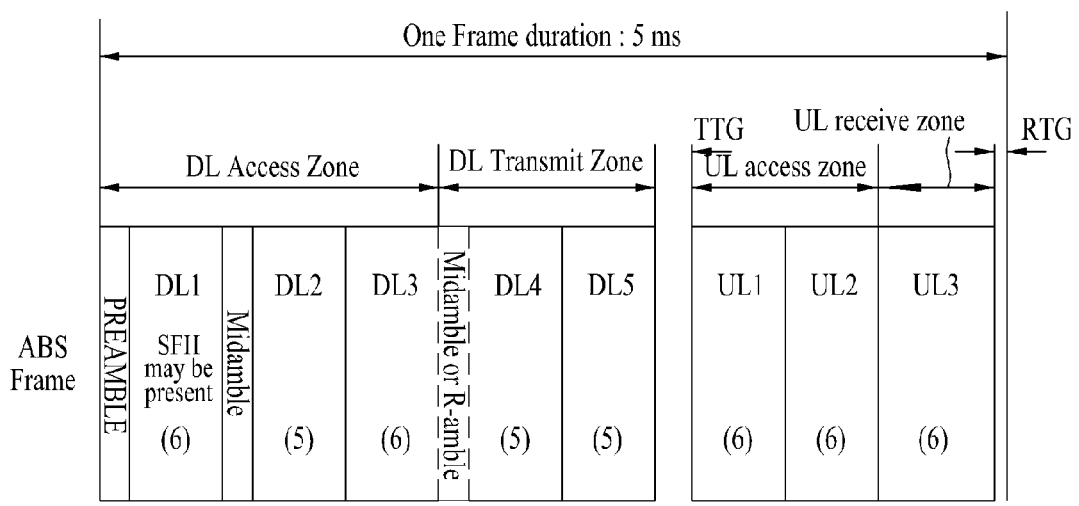
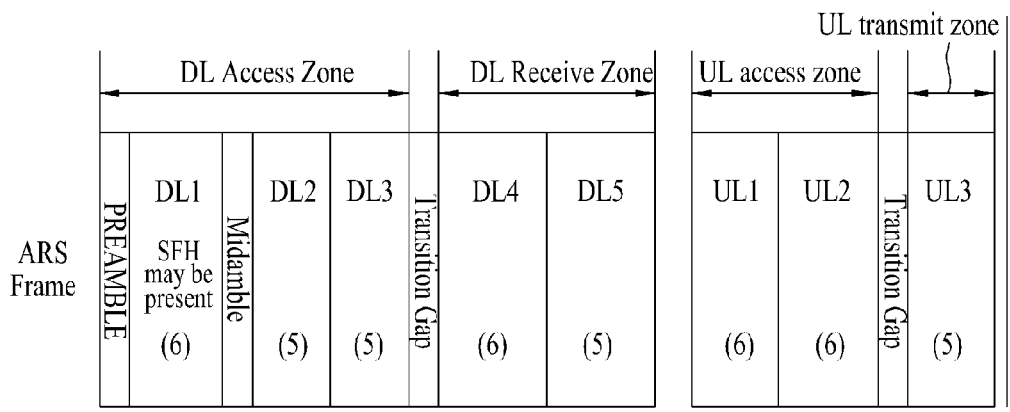

FIG. 7
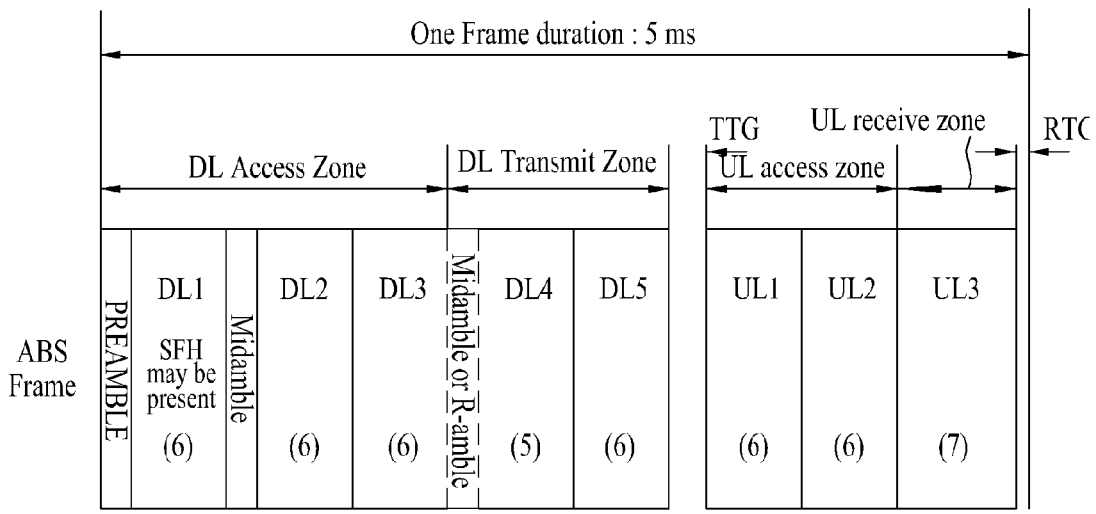
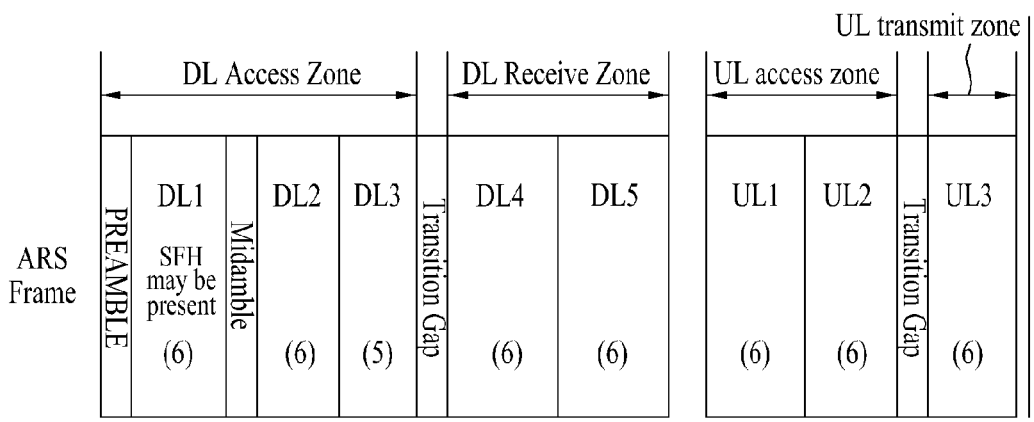

METHOD IN WHICH A MOBILE TERMINAL TRANSMITS/RECEIVES A SIGNAL USING A PREDETERMINED TDD FRAME STRUCTURE IN A WIRELESS COMMUNICATION SYSTEM

CROSS-REFERENCE TO RELATED APPLICATIONS

This application is the National Stage filing under 35 U.S.C. 371 of International Application No. PCT/KR2010/005846, filed on Aug. 30, 2010, which claims the benefit of earlier filing date and right of priority to Korean Patent Application No. 10-2010-0084098, filed on Aug. 30, 2010, and also claims the benefit of U.S. Provisional Application Nos. 61/238,696, filed on Sep. 1, 2009 and 61/237,707, filed on Aug. 28, 2009, the contents of which are all incorporated by reference herein in their entirety.

BACKGROUND OF THE INVENTION

1. Field of the Invention

The present invention relates to a wireless communication system.

2. Discussion of the Related Art

An IEEE (Institute of Electrical and Electronics Engineers) 802.16m system can support both FDD (Frequency Division Duplex) including H-FDD (Half-Frequency Division Duplex), and TDD (Time Division Duplex).

The IEEE 802.16m system uses OFDMA (Orthogonal Frequency Division Multiplexing Access) as a multiplexing access scheme on downlink (DL) and uplink (UL).

A description will be made of a frame structure of an IEEE 802.16m system that is a mobile communication system.

FIG. 1 illustrates a basic frame structure of the IEEE 802.16m system.

Referring to FIG. 1, one superframe having a size of 20 ms beings with a superframe header (SHF) and is divided into 4 radio frames having a size of 5 ms. When one of channel bandwidths of 5 MHz, 10 MHz and 20 MHz is used, each of the 5 ms radio frames consists of 8 subframes. One subframe can be allocated for DL or UL transmission.

The IEEE 802.16m system, one of mobile communication systems, has more than three types of subframes. Type-1 subframe includes 6 OFDMA symbols, Type-2 subframe includes 7 OFDMA symbols, and Type-3 subframe includes 5 OFDMA symbols.

The basic frame structure can be applied to both FDD including H-FDD, and TDD. In a TDD system, 2 switching points are present in each radio frame. Switching points can be defined according to directivity change from downlink to uplink or from uplink to downlink.

When the channel state between a base station (BS) and a mobile station (MS) is poor in a wireless communication system, a relay station (RS) can be set between the BS and the MS to provide a radio channel in a good state to the MS. Furthermore, an RS can be introduced to a cell boundary area having a poor channel state to provide a high-speed data channel and extend a cell service range. That is, an RS is currently widely used as a technology introduced to remove a radio shadow area in a wireless communication system. While past RSs are limited to repeaters for amplifying a signal and transmitting the amplified signal, recent RSs have been developed into a more intelligent form. Furthermore, RS technology is an essential technology for reducing BS installation cost and backhaul network maintenance cost, extending service coverage, and improving data throughput in next-generation mobile communication systems. With the development of relay technology, RSs used in a conventional wireless communication system need to be supported by a frame structure of a new wireless communication system.

However, no method of configuring frame structures of a BS and RS for supporting the RS in IEEE 802.16m systems has been studied.

SUMMARY OF THE INVENTION

Technical Problem

The present invention provides a method in which a mobile station (MS) transmits/receives a signal using a predetermined TDD (Time Division Duplex) frame structure.

The present invention also provides an MS that transmits/receives a signal using a predetermined TDD frame structure.

Technical objects to be solved by the present invention are not limited to the above-mentioned objects, and other technical problems not mentioned above can be considered by one skilled in the art from the exemplary embodiments of the present invention to be described hereinbelow.

Technical Solution

According to one aspect of the present invention, there is provided a method for transceiving signals at a mobile station (MS) using a predetermined time division duplex (TDD) frame structure in a wireless communication system includes receiving a midamble from a base station (BS) and a relay station (RS), wherein the MS receives, from the BS, a first midamble through a second subframe of a downlink access zone of the BS and/or through a first subframe of a downlink relay zone that follows the downlink access zone, or receives, from the RS, a second midamble through a second subframe of a downlink access zone of the RS, wherein in the TDD frame structure of the RS, a transition gap in a downlink region is located in the last subframe of the downlink access zone of the RS or in a first subframe of a downlink relay zone of the RS, which follows the downlink access zone of the RS, a transition gap in an uplink region of the RS is located in a first subframe of an uplink relay zone of the RS, and wherein a channel bandwidth of the TDD frame of both the BS and the RS is either 5 MHz, 10 MH or 20 MHz.

The RS may check a channel state with a serving BS by receiving a midamble transmitted through the downlink relay zone of the BS.

The first midamble may be received through a first or last symbol of the first subframe of the downlink relay zone following the downlink access zone of the BS. When the first midamble is received through the first or last symbol of the downlink relay zone, the transition gap in the downlink region of the RS may be located in the last symbol of the downlink access zone of the RS or the first symbol of the downlink relay zone of the RS.

When the ratio of the number of subframes included in the downlink region to the number of subframes included in the uplink region is 3:5 and a CP (Cyclic Prefix) length corresponds to $\frac{1}{16}$ of an effective symbol length in the TDD frame structure, the second subframe of the downlink access zone of the BS may correspond to Type-1 subframe consisting of 6 OFDMA symbols, and the second subframe of the downlink access zone of the RS may correspond to Type-3 subframe or Type-1 subframe according to the location of the transition gap in the downlink region of the RS. In this case, in the TDD frame structure of the RS, the transition gap in the uplink region may be located in the first subframe of the uplink relay zone, and the first subframe of the uplink relay zone may correspond to Type-3 subframe.

When the ratio of the number of subframes included in the downlink region to the number of subframes included in the uplink region is 4:4 and a CP length corresponds to ⅛ of an effective symbol length in the TDD frame structure, the second subframe of the downlink access zone of the BS may correspond to Type-3 subframe consisting of 5 OFDMA symbols, and the second subframe of the downlink access zone of the RS may correspond to Type-3 subframe or type-1 subframe consisting of 6 OFDMA symbols according to the location of the transition gap in the downlink region of the RS. In this case, in the TDD frame structure of the RS, the transition gap in the uplink region may be located in the first subframe of the uplink relay zone, and the first subframe of the uplink relay zone may correspond to Type-3 subframe.

When the ratio of the number of subframes included in the downlink region to the number of subframes included in the uplink region is 4:4, the ratio of the number of subframes included in the downlink access zone to the number of subframes included in the downlink relay zone is 3:1, and a CP length corresponds to 1/16 of an effective symbol length in the TDD frame structure, the second subframe of the downlink access zone of the BS may be Type-1 subframe consisting of 6 OFDMA symbols, and the second subframe of the downlink access zone of the RS may be Type-1 subframe. In this case, in the TDD frame structure of the RS, the transition gap in the uplink region may be located in the first subframe of the uplink relay zone, and the first subframe of the uplink relay zone may be Type-1 subframe.

When the ratio of the number of subframes included in the downlink region to the number of subframes included in the uplink region is 4:4, the ratio of the number of subframes included in the downlink access zone to the number of subframes included in the downlink relay zone is 2:2, and a CP length corresponds to 1/16 of an effective symbol length in the TDD frame structure, the second subframe of the downlink access zone of the BS may be Type-1 subframe consisting of 6 OFDMA symbols, and the second subframe of the downlink access zone of the RS may be Type-3 subframe consisting of 5 OFDMA symbols or Type-1 subframe according to the location of the transition gap in the downlink region of the RS. In this case, in the TDD frame structure of the RS, the transition gap in the uplink region may be located in the first subframe of the uplink relay zone, and the first subframe of the uplink relay zone may be Type-1 subframe.

When the ratio of the number of subframes included in the downlink region to the number of subframes included in the uplink region is 5:3 and a CP length corresponds to ⅛ of an effective symbol length in the TDD frame structure, the second subframes of the downlink access zones of the BS and the RS may correspond to Type-3 subframe consisting of 5 OFDMA symbols. In this case, in the TDD frame structure of the RS, the transition gap in the uplink region may be located in the first subframe of the uplink relay zone, and the first subframe of the uplink relay zone may be Type-3 subframe.

When the ratio of the number of subframes included in the downlink region to the number of subframes included in the uplink region is 5:3 and a CP length corresponds to ⅛ of an effective symbol length in the TDD frame structure, the second subframes of the downlink access zones of the BS and the RS may correspond to Type-1 subframe consisting of 6 OFDMA symbols. In this case, in the TDD frame structure of the RS, the transition gap in the uplink region may be located in the first subframe of the uplink relay zone, and the first subframe of the uplink relay zone may be Type-1 subframe.

According to another aspect of the present invention, an MS for transceiving signals using a predetermined TDD frame structure in a wireless communication system comprises a receiver for receiving a midamble from a BS and an RS, wherein the receiver receives, from the BS, a first midamble through a second subframe of a downlink access zone of the BS and/or through a first subframe of a downlink relay zone that follows the downlink access zone, or receives, from the RS, a second midamble through a second subframe of a downlink access zone of the RS.

In the TDD frame structure of the RS, a transition gap in a downlink region is located in the last subframe of the downlink access zone of the RS or in a first subframe of a downlink relay zone of the RS, which follows the downlink access zone of the RS, a transition gap in an uplink region of the RS is located in a first subframe of an uplink relay zone of the RS, and a channel bandwidth of the TDD frame of both the BS and the RS is either 5 MHz, 10 MH or 20 MHz. Here, signals can be transmitted/received through the RS in other channel bandwidths using the frame structure.

The BS may transmit the same midamble to the MS and the RS, or transmit midambles to the MS and the RS using the same format or dedicated formats through station specific resources.

Advantageous Effects

The frame structure of the BS and RS according to the present invention allows an MS to efficiently receive a midamble so as to measure a channel state and transmit/receive a signal.

It will be appreciated by persons skilled in the art that the effects that can be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention. In the drawings:

FIG. 3 illustrates exemplary ABS and ARS frame structures having a downlink/uplink ratio of 3:5 and a Tb CP length of 1/16;

FIG. 4 illustrates exemplary ABS and ARS frame structures having a downlink/uplink ratio of 4:4 and a Tb CP length of ⅛;

FIGS. 6 and 7 illustrate exemplary ABS and ARS frame structures having a downlink/uplink ratio of 5:3 and Tb CP lengths of ⅛ and 1/16 for channel bandwidths of 5/10/20 MHz.

BEST MODE FOR CARRYING OUT THE INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following detailed description is given under the assumption that a system conforming to one of the 3GPP LTE series of standards is being used. However, the description is applicable to any other mobile communication system except for specific features inherent to the 3GPP LTE series of standards.

In some instances, known structures and devices are omitted or are shown in block diagram form, focusing on important features of the structures and devices, so as not to obscure the concept of the invention. The same reference numbers will be used throughout this specification to refer to the same or like parts.

In the following description, the term terminal generically refers to a mobile or fixed user terminal device such as a User Equipment (UE), a Mobile Station (MS), Advance Mobile Station (AMS), etc. In addition, the term Base Station (BS) generically refers to any node at a network end which communicates with a UE, such as a Node B, an eNode B, etc. Furthermore, the term relay may refer to a Relay Station (RS), Relay Node (RN), etc.

In a mobile communication system, an MS can receive information from a BS through a downlink and transmit information to the BS through an uplink. Information transmitted or received by the MS includes data and control information and a variety of physical channels exist according to types and purposes of information transmitted or received by the MS.

Figure 1:
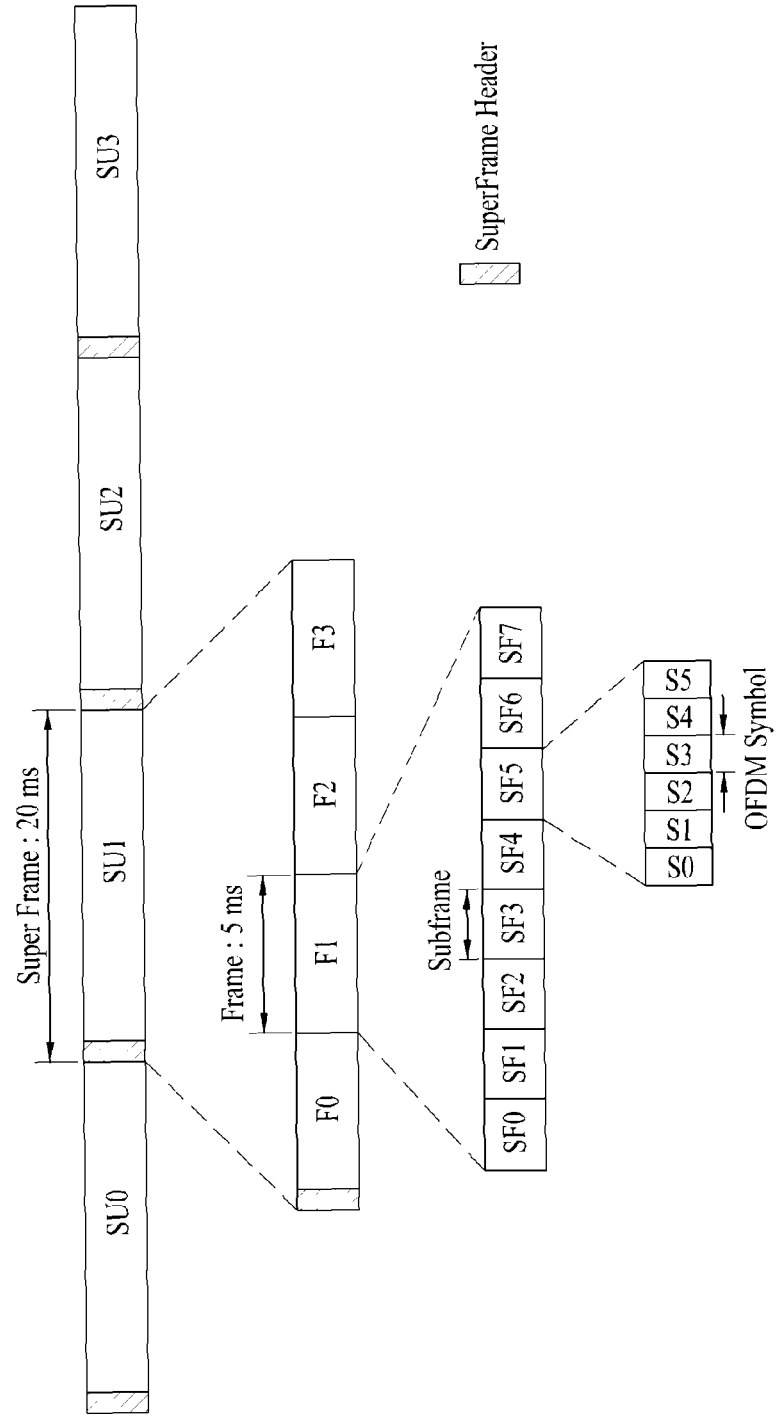
FIG. 1 illustrates a basic frame structure in an IEEE 802.16m system.
Figure 2:
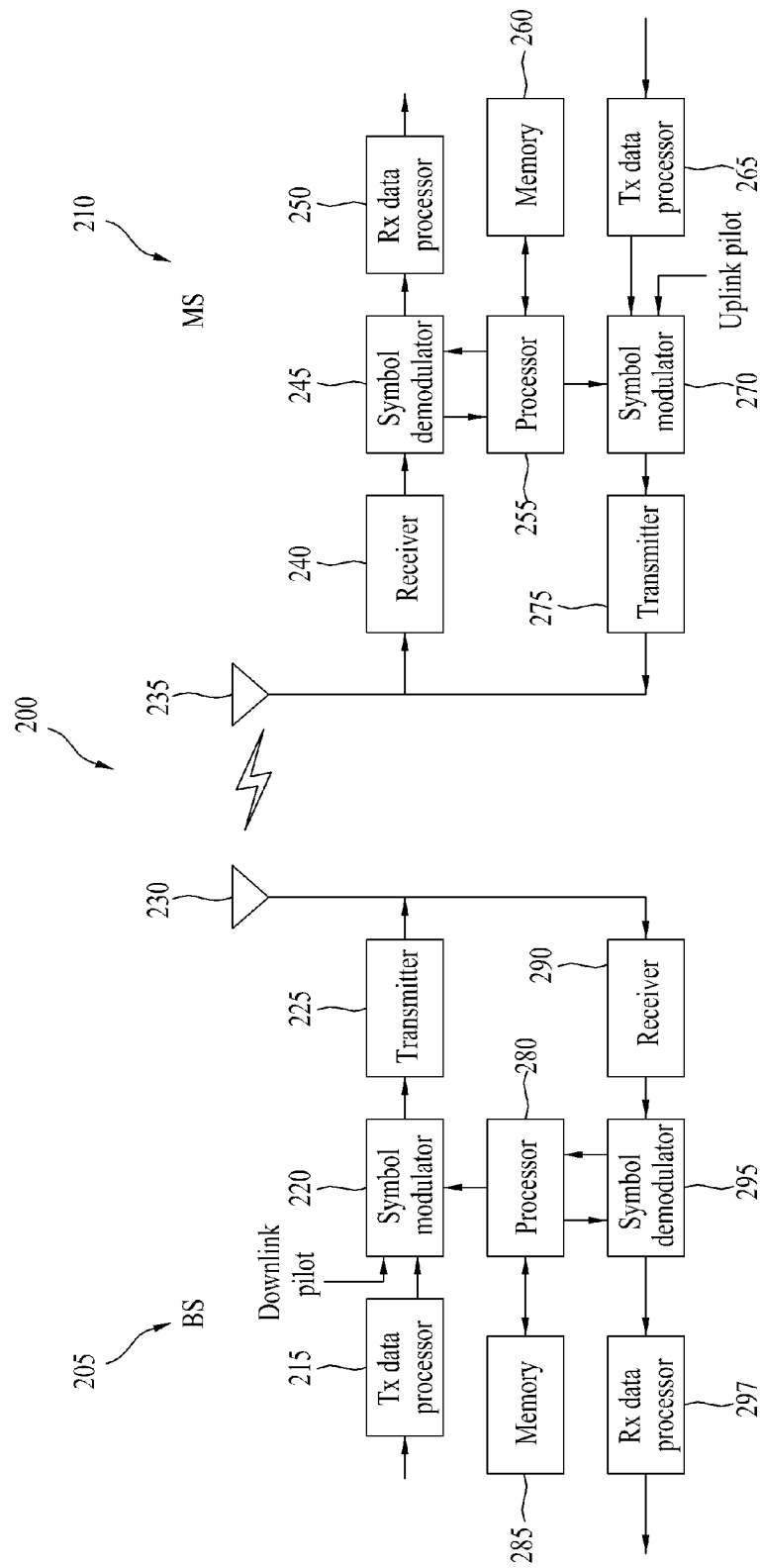
FIG. 2 is a block diagram illustrating configurations of a base station (BS) 205 and a mobile station (MS) 210 in a wireless communication system according to an embodiment of the present invention.

FIG. 2 is a block diagram of a BS 205 and an MS 210 in a wireless communication system according to the present invention.

While one BS 205 and one MS 210 are shown in FIG. 2 to simplify the configuration of a wireless communication system 200, the wireless communication system 200 may obviously include a plurality of BSs and/or a plurality of MSs.

Referring to FIG. 2, the BS 205 may include a Tx data processor 215, a symbol modulator 220, a transmitter 225, a Transmission/Reception (Tx/Rx) antenna 230, a processor 280, a memory 285, a receiver 290, a symbol demodulator 295, and an Rx data processor 297. The MS 210 may include a Tx data processor 265, a symbol modulator 270, a transmitter 275, a Tx/Rx antenna 235, a processor 255, a memory 260, a receiver 240, a symbol demodulator 245, and an Rx data processor 250. While the antennas 230 and 235 are each shown as a single antenna in the BS 205 and the MS 210, they include multiple antennas. Hence, the BS 205 and the MS 210 support Multiple Input Multiple Output (MIMO), specifically both Single User-MIMO (SU-MIMO) and Multi User-MIMO (MU-MIMO) in the present invention.

On the downlink, the Tx data processor 215 receives traffic data, processes the received traffic data through formatting, coding, interleaving, and modulation (i.e. symbol mapping), and thus outputs modulated symbols (or data symbols). The symbol modulator 220 processes the data symbols received from the Tx data processor 215 and pilot symbols, thus producing a symbol stream.

More specifically, the symbol modulator 220 multiplexes the data symbols and the pilot symbols and transmits the multiplexed symbols to the transmitter 225. Each transmission symbol may be a data symbol, a pilot symbol or a zero signal value. Pilot symbols may be transmitted successively during each symbol period. The pilot symbols may be Frequency Division Multiplexing (FDM) symbols, Orthogonal Frequency Division Multiplexing (OFDM) symbols, Time Division Multiplexing (TDM) symbols, or Code Division Multiplexing (CDM) symbols.

The transmitter 225 converts the symbol stream into one or more analog signals and generates a downlink signal suitable for transmission on a radio channel by additionally processing (e.g. amplifying, filtering, and frequency-upconverting) the analog signals. The downlink signal is transmitted to the MS 210 through the antenna 230.

The MS 110 receives the downlink signal from the BS 205 and provides the received downlink signal to the receiver 240. The receiver 240 processes the downlink signal, for example, through filtering, amplification and frequency downconversion and converts the processed downlink signal to digital samples. The symbol demodulator 245 demodulates received pilot symbols and outputs the demodulated pilot symbols to the processor 255 for use in channel estimation.

The symbol demodulator 245 receives a frequency response estimate of the downlink from the processor 255 and acquires data symbol estimates (i.e. estimates of the transmitted data symbols) by demodulating the received data symbols using the frequency response estimate. The Rx data processor 250 demodulates the data symbol estimates (i.e. performs symbol demapping), deinterleaves the demodulated data symbols, and decodes the deinterleaved data symbols, thereby recovering the traffic data transmitted by the BS 205.

The operations of the symbol demodulator 245 and the Rx data processor 250 are complementary to the operations of the symbol modulator 220 and the Tx data processor 215 of the BS 205.

On the uplink, in the MS 210, the Tx data processor 265 outputs data symbols by processing received traffic data. The symbol modulator 270 multiplexes the data symbols received from the Tx data processor 265 with pilot symbols, modulates the multiplexed symbols, and outputs a stream of the symbols to the transmitter 275. The transmitter 275 generates an uplink signal by processing the symbol stream and transmits the uplink signal to the BS 205 through the antenna 235.

The BS 205 receives the uplink signal from the MS 210 through the antenna 230. In the BS 205, the receiver 290 acquires digital samples by processing the uplink signal. The symbol demodulator 295 provides uplink pilot symbol estimates and uplink data symbol estimates by processing the digital samples. The Rx data processor 297 processes the data symbol estimates, thereby recovering the traffic data transmitted by the MS 210.

The processors 255 and 280 control (e.g. adjust, manage, etc.) operations of the MS 210 and the BS 205. The processors 255 and 280 may be connected respectively to the memories 260 and 285 that store program codes and data. The memories 260 and 285 store an operating system, applications, and general files, in connection with the processors 255 and 280.

The processors 255 and 280 may also be called controllers, microcontrollers, microprocessors, or microcomputers. The processors 255 and 280 may be configured in hardware, firmware, software, or a combination of them. When embodiments of the present invention are implemented using hardware, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) which are adapted to implement the present invention may be included in the processors 255 and 280.

On the other hand, if the embodiments of the present invention are implemented using firmware or software, the firmware or software may be configured to include a module, a procedure, a function, etc. which performs functions or operations according to the present invention. The firmware or software may be included in the processors 255 and 280, or stored in the memories 260 and 285 and invoked from the memories 260 and 285 by the processors 255 and 280.

The layers of radio interface protocols between an MS/BS and a wireless communication system (network) may be classified into Layers 1, 2 and 3 (L1, L2 and L3) based on the three lowest layers of the Open System Interconnection (OSI) model. A physical layer corresponds to L1 and provides an information transmission service on physical channels. A Radio Resource Control (RRC) layer corresponds to L3 and provides radio control resources between the MS and the network. The MS/BS and the network exchange RRC messages through the RRC layers.

Operation modes of an RS include a transparent mode and a non-transparent mode.

The transparent mode improves the throughput of a multi-hop relay system. All MSs and RSs can directly receive a preamble and MAP information transmitted from a BS of the multi-hop relay system so as to acquire synchronization with the BS and frame configuration information.

The non-transparent mode is used to extend the cell coverage of the multi-hop relay system. A BS and an RS transmit preambles and MAP information to an MS at the same time such that the MS can acquire synchronization with the BS or RS and frame configuration information. In the non-transparent mode, the RS can acquire synchronization with the BS through a midamble and grasp frame configuration information through MAP information that follows the midamble. The non-transparent mode can be used to extend cell coverage in order to improve communication performances of MSs located on a cell boundary.

The present invention proposes a frame structure for supporting a 16 m MS using an RS in an Advanced Air Interface (AAI) (e.g. IEEE 802.16m) system. The AAI system mentioned in the specification is exemplary and there is no restriction on system type and definition. The frame structure of the RS for supporting the 16 m MS using the RS in the AAI system can be configured on the basis of FDD and TDD frame structures defined in IEEE 802.16m. Hence, the frame structure of the RS for supporting the MS can be varied according to the ratio of the number of UL subframes to the number of DL subframes, which are used for a BS to support the MS (referred to as DL/UL ratio hereinafter).

In a frame structure of the BS, a DL region includes a DL access zone and a DL transmit zone (or DL relay zone) and a UL region includes a UL access zone and a UL receive zone (or UL relay zone). The BS transmits a signal (or data) to the MS through the DL access zone and transmits a signal to the RS through the DL transmit zone. The MS can receive a signal from the BS through the DL transmit zone. The BS receives a signal from the MS through the UL access zone and receives a signal from the RS through the UL receive zone.

In the RS frame structure, a DL region includes a DL access zone and a DL receive zone (or DL relay zone) and a UL region includes a UL access zone and a UL transmit zone (or UL relay zone). The RS transmits a signal (or data) to the MS through the DL access zone and receives a signal from the BS through the DL receive zone. The RS receives a signal from the MS through the UL access zone and transmits a signal to the BS through the UL transmit zone.

The DL transmit zone of the BS and the DL receive zone of the RS can be referred to as a DL relay zone of the BS, and the UL receive zone of the BS and the UL transmit zone of the RS can be referred to as a UL relay zone. "Symbol" used in the present invention can not only include OFDMA (Orthogonal Frequency Division Multiple Access) symbols but also other symbols.

In a TDD frame structure, DL/UL ratios available for the BS considering the RS include 3:5, 4:4, 5:3 and 6:2. When a DL/UL ratio of 3:5 is used, frame structures of the BS and the RS can have formats as shown in FIG. 3.

FIG. 3 illustrates exemplary ABS (Advanced Base Station) and ARS (Advanced Relay Station) frame structures, which have a DL/UL ratio of 3:5 and a Tb CP length of $\frac{1}{16}$.

Referring to FIG. 3, in a TDD frame structure having a CP (Cyclic Prefix) length corresponding to $\frac{1}{16}$ of an effective symbol length (i.e., $\frac{1}{16}$ Tb CP), the second and the last subframes correspond to Type-2 subframe consisting of 7 symbols. In the case of DL/UL ratio of 3:5, in order for the BS to transmit data to the MS through the RS, the DL region of the BS is divided into a DL access zone and a DL transmit zone (or DL relay zone) and the UL region of the BS is divided into a UL access zone and a UL receive zone (or UL relay zone). In the downlink and uplink regions, different numbers of subframes may be allocated to the zones.

As shown in FIG. 3, the BS can allocate subframes to the DL access zone and the DL transmit zone in the ratio of 2:1 in the DL region. In this case, in order to configure the frame structure corresponding to that of the BS, the RS can also allocate subframes to the DL access zone and the DL receive zone in the ratio of 2:1 in the DL region. In the DL region of the RS, a transition gap for transition may need to be present between the second DL subframe DL2 and the third DL subframe DL3. While Type-2 subframe consisting of 7 symbols can be present as the second DL subframe in the DL region of the RS, the second DL subframe can be modified into Type-1 subframe consisting of 6 symbols when the last symbol of the second DL subframe is allocated to the transition gap. The BS can transmit a midamble such that the MS or the RS can measure a channel state (e.g. channel quality information (CQI)), precoding matrix index (PMI), modulation and coding scheme (MCS)).

The MS and the RS need to receive the same midamble from the BS to measure channel states. To achieve this, the BS can transmit the midamble to the RS through the DL transmit zone. In this case, the BS can transmit the midamble using the first or last symbol of the third DL subframe DL3 allocated as the DL transmit zone, as shown in FIG. 3. However, the location of a preamble in the third DL subframe DL3 of the frame structure of the BS, shown in FIG. 3, is not limited. Though the third DL subframe is Type-1 subframe in the frame structure of the BS, the third DL subframe has Type-3 subframe format because one symbol thereof is excluded to be used to transmit the midamble.

The RS can transmit a midamble to MSs belonging thereto using the DL access zone. For example, the RS can transmit the midamble through the second DL subframe DL2, as shown in FIG. 3. When the RS transmits the midamble to an MS using the second DL subframe DL2 while the second DL subframe includes a transition gap, the second DL subframe is modified into Type-3 subframe and transmits data using 5 symbols. Here, the subframe including the midamble is not limited to the second DL subframe. In addition, the location of the symbol corresponding of the midamble transmitted by the RS is not limited. If the BS transits a midamble or an R-amble using the first symbol of the DL transmit zone, the transition gap in the frame structure of the RS needs to be located at the last symbol of the DL access zone instead of the first symbol of the DL receive zone. If the BS does not transmit the midamble or R-amble using the first symbol of the DL transmit zone, the transition gap in the frame structure of the RS can be located at the first symbol of the DL receive zone or the last symbol of the DL access zone. That is, the transition gap cannot be located at a symbol that is timing-aligned with a midamble. Consequently, the midamble transmission timing of the BS must not correspond to the transition gap timing of the RS.

The BS and the RS may transmit midambles to the MS at the same location in their DL access zones. That is, the BS and the RS can transmit the midambles in the second DL subframes of their frame structures, as shown in FIG. 3. At this time, the BS may additionally transmit a midamble or an R-amble for the RS using the DL transmit zone (i.e., the third subframe DL3). The midamble in the DL transmit zone of the BS and the transition gap in the frame structure of the RS can have the location relationship between them as described above. Here, the BS or the RS can transmit a midamble to the MS using the second DL subframe all the time. Furthermore, the BS can transmit a midamble or an R-amble to the RS at every location corresponding to each of integer multiples of the frame (e.g. every even-numbered or odd-numbered frame, or every superframe) because a channel state between the BS and the RS is stable.

Accordingly, while the third DL subframe DL3 used for the BS to transmit the midamble has Type-3 subframe format when the midamble is transmitted, the third DL subframe DL3 can be configured in Type-1 subframe format when the midamble is not transmitted. Here, information on the midamble for the RS, transmitted by the BS, can be signaled by the BS to the RS. A midamble can be transmitted using the first symbol of a subframe of each zone, for example. However, the location of the symbol corresponding to the midamble in the subframe is not limited.

Since it is necessary to measure the channel state between the RS and the MS supported by the RS when the BS transmits a midamble, as described above, the RS can also transmit a midamble to the MS using a subframe in the DL access zone. If the BS also transmits the midamble using the DL access zone thereof, the RS transmits the midamble to the MS at the same timing. Here, the RS can transmit the midamble to the MS using the first symbol of the second DL subframe DL2 as shown in the ARS frame structure of FIG. 3.

The frame structures shown in FIG. 3 are summarized as follows.

In the ABS and ARS frame structures shown in FIG. 3, the DL access zones of the BS and the RS have the same size and the DL transmit zone of the BS and the DL receive zone of the RS have the same size. The BS and the RS can transmit midambles at the same location (or timing) in their DL access zones (for example, a midamble can be located at the first symbol of the last subframe or the subframe prior to the last subframe in each DL access zone. It is preferable not to transmit the midamble using the first subframe because a preamble is present in the first subframe). The BS can transmit the midamble (or R-amble) for the RS through the DL transmit zone (e.g., the first symbol of the last subframe or the subframe prior to the last subframe in the DL transmit zone) in an interval of an integer multiple of the frame. The BS can transmit the midamble through the DL access zone such that the MS and the RS can read the midamble simultaneously. The RS can transmit the midamble through the DL access zone thereof.

The transition gap in the DL region of the frame structure of the RS can be located at the last symbol of the DL access zone or the first symbol of the DL receive zone. If the BS transmits a midamble using the first symbol of the DL transmit zone, the transition gap of the RS needs to be located at the last symbol of the DL access zone. If the transition gap of the RS is located at the first symbol of the DL receive zone, the midamble transmitted by the BS through the DL transmit zone may be located at the second symbol of the DL transmit zone (i.e., the midamble is moved to the next symbol in order to avoid the transition gap). In the ARS frame structure, the midamble and the transition gap cannot be located in the same position in subframes other than Type-2 subframe consisting of 7 symbols.

In the ARS frame structure shown in FIG. 3, the locations of the midamble and the transition gap and relationship between the locations do not involve a CP length (or CP time), TDD/FDD modes, DL/UL ratio, etc.

In the frame structures shown in FIG. 3, the BS can allocate subframes to the UL access zone and the UL receive zone in the UL region in the ratio of 3:2. When the BS configures the UL access zone and the UL receive zone in the ratio of 3:2, the RS can also allocate subframes to the UL access zone and the UL transmit zone in the ratio of 3:2 to configure the UL access zone and the UL transmit zone corresponding to the UL access zone and the UL receive zone of the BS. One symbol of the subframe located between the UL access zone and the UL transmit zone of the RS can be allocated to the transition gap for transition. In the frame structure of the RS, one symbol needs to be allocated to the transition gap, and thus the UL subframe including the transition gap has a one-symbol-reduced subframe type.

As shown in FIG. 3, when the transition gap is allocated to a subframe of the UL transmit zone, the RS can transmit a control channel using Type-3 UL subframe consisting of 5 symbols or transmit only data without the control channel. Otherwise, in the frame structure of the RS, the subframe including the transition gap can be punctured in order to prevent a UL subframe consisting of 5 symbols from being generated. The frame structures, transition gap and Type-3 subframe in the uplink are summarized as follow.

When the transition gap is located in Type-1 subframe consisting of 6 symbols, Type-1 subframe can be modified into Type-3 subframe consisting of 5 symbols. In this case, the RS can transmit the control channel using Type-3 subframe, or transmit only data without the control channel. The subframe in which the transition gap needs to be included can be punctured in order to prevent Type-3 subframe from being generated. If Type-2 subframe consisting of 7 symbols is present in two subframes located at the boundary of the UL access zone and the UL transmit zone, one of the symbols of Type-2 subframe can be allocated to the transition gap, and thus Type-2 subframe can be used as Type-1 subframe.

If Type-3 subframe has to be present in the frame structure due to one symbol for the transition gap, it may be desirable that Type-3 subframe is present in the UL transmit zone. In doing so, the UL access zone does not include Type-3 subframe so as not to affect MSs, and only the RS transmits a signal using Type-3 subframe. Here, the BS can allocate resources to MSs belonging thereto at the same location as Type-3 subframe of the RS. In this case, Type-1 subframe can be assigned since the transition gap is not needed.

The ratio of the UL access zone to the UL transmit zone of the RS is preferably 1:1. Otherwise, the number of subframes allocated to the UL access zone may be larger than the number of subframes allocated to the UL transmit zone in order to improve link quality between the BS and the RS. If the subframe including the transition gap of the RS needs to be punctured, it is preferable to puncture the subframe such that the ratio of the UL access zone to the UL transmit zone become 1:1. In order to avoid data loss due to the punctured subframe, the length of a subframe adjacent to the punctured subframe is extended to the punctured subframe to use a long subframe. To achieve this, it is possible to consider a method of puncturing the last subframe of the UL access zone and extending the length of the subframe prior to the last subframe. For example, the subframe prior to the last subframe of the UL access zone can be defined as Type-4 subframe having 9 symbols. Alternatively, when one symbol of the last subframe of the UL access zone of the RS is allocated to the transition gap and thus the last subframe is changed to Type-3 subframe, the Type-3 subframe can be connected with the subframe prior to the last subframe through a long-TTI subframe. The UL access zone of the RS can use only one long-TTI subframe.

In the ARS uplink frame structure shown in FIG. 3, the locations of the transition gap and Type-3 subframe and the relationship between the locations do not involve the CP length, TDD/FDD modes, DL/UL ratio, etc.

FIG. 4 illustrates exemplary ABS and ARS frame structures having a DL/UL ratio of 4:4 and a Tb CP length of 1/8.

When a BS uses a frame structure having a Tb CP length of 1/8, a DL region can be configured such that the ratio of a DL access zone to a DL transmit zone is 2:2, as shown in FIG. 4. That is, the DL frame structure of the BS can be configured in such a manner that the ratio of the number of subframes of the DL access zone to the number of subframes of the DL transmit zone is 2:2. Here, an RS linked with the BS can configure a DL region having a DL access zone and a DL receive zone in the ratio of 2:2 such that the DL access zone and the DL receive zone correspond to the DL access zone and the DL transmit zone of the BS.

Accordingly, 2 subframes can be allocated to each zone, as shown in FIG. 4. The frame structure of the RS requires a transition gap between the DL access zone and the DL receive zone of the DL region thereof. One symbol of the last subframe of the DL access zone or one symbol of the first subframe of the DL receive zone can be allocated to the transition gap. Accordingly, the subframe including the transition gap can become a one-symbol-reduced subframe. That is, the subframe including the transition gap can be changed from Type-1 subframe consisting 6 symbols to Type-3 subframe having 5 symbols, as shown in FIG. 4. To measure a channel state between the BS and the RS, a channel state between the BS and an MS, and a channel state between the RS and the MS, the BS and the RS can respectively transmit midambles or R-ambles. The MS or the RS can obtain information about channel states with other stations using a received midamble or R-amble. Examples of midambles or R-ambles transmitted by the BS and/or the RS to acquire channel state information are shown in FIG. 4.

The BS can transmit a midamble such that the MS and the RS can obtain channel state information using two methods.

Using the first method, the BS can transmit midambles to the RS and the MS, respectively. The BS and the RS can transmit midambles to the MS through the second subframes of their DL access zones. Here, the locations of the midambles transmitted at the same location in the subframes are not limited, and the subframes carrying the midambles are configured with symbols other than symbols used as the midambles. For example, when the frame structure having a Tb CP length of 1/8 for 5/10/20 MHz channel bandwidths is used, as shown in FIG. 4, a subframe carrying a midamble may be Type-3 subframe having 5 symbols. The BS can transmit a midamble or an R-amble using a subframe allocated to the DL transmit zone in order to check the channel state between the BS and the RS in addition to the channel state between the BS and the MS. Here, because the last subframe DL4 allocated to the DL transmit zone is Type-3 subframe, the BS can transmit the midamble using the subframe DL3 prior to the last subframe DL4. Accordingly, at least two subframes need to be allocated to the DL transmit zone of the BS and the DL receive zone of the RS in order for the BS to transmit the midamble or R-amble.

The location of the midamble or R-amble transmitted from the BS to the RS is not limited in the subframe. The channel state between the RS and the BS is relatively stable, and thus the BS can transmit the midamble or R-amble to the RS at every even-numbered or odd-numbered frame, or for multiple frames. When the BS transmits the midamble or R-amble for the RS through the DL transmit zone, as shown in FIG. 4, the subframe carrying the midamble or R-amble may be fixed in order to achieve frame alignment.

In the second method in which the BS transmits a midamble to the RS and the MS in order to acquire channel information of the RS and the MS, the BS transmits one midamble to both the MS and the RS using the DL transmit zone thereof. As shown in FIG. 4, the BS can transmit the midamble or an R-amble in the DL transmit zone. Because the last subframe of the DL transmit zone is Type-3 subframe consisting of 5 symbols, the midamble is transmitted using the subframe DL3 prior to the last subframe. Accordingly, the subframe carrying the midamble becomes Type-3 subframe, as shown in FIG. 4, since one symbol thereof is allocated to the midamble. Here, while the BS can transmit the midamble using the first or last symbol of the subframe, the location at which the midamble is transmitted is not limited thereto. When the BS transmits one midamble to the RS and the MS in the DL transmit zone, the RS transmits a midamble through the subframe DL2 in the DL access zone in order to acquire channel information about the MS, as described above. The subframe DL2 in the frame structure of the RS can have Type-3 subframe format.

A UL region of the BS is divided into a UL access zone and a UL receive zone and a UL region of the RS is divided into a UL access zone and a UL transmit zone. The number of subframes allocated to each zone is not limited. A transition gap is present between the UL access zone and the UL transmit zone in the UL region of the RS, as described above with reference to FIG. 3. The transition gap may be located in the UL access zone or in the UL transmit zone. A subframe whose one symbol is allocated to the transition gap consists of 5 symbols. This subframe having 5 symbols can be used only for transmission of data or punctured.

Figure 5:
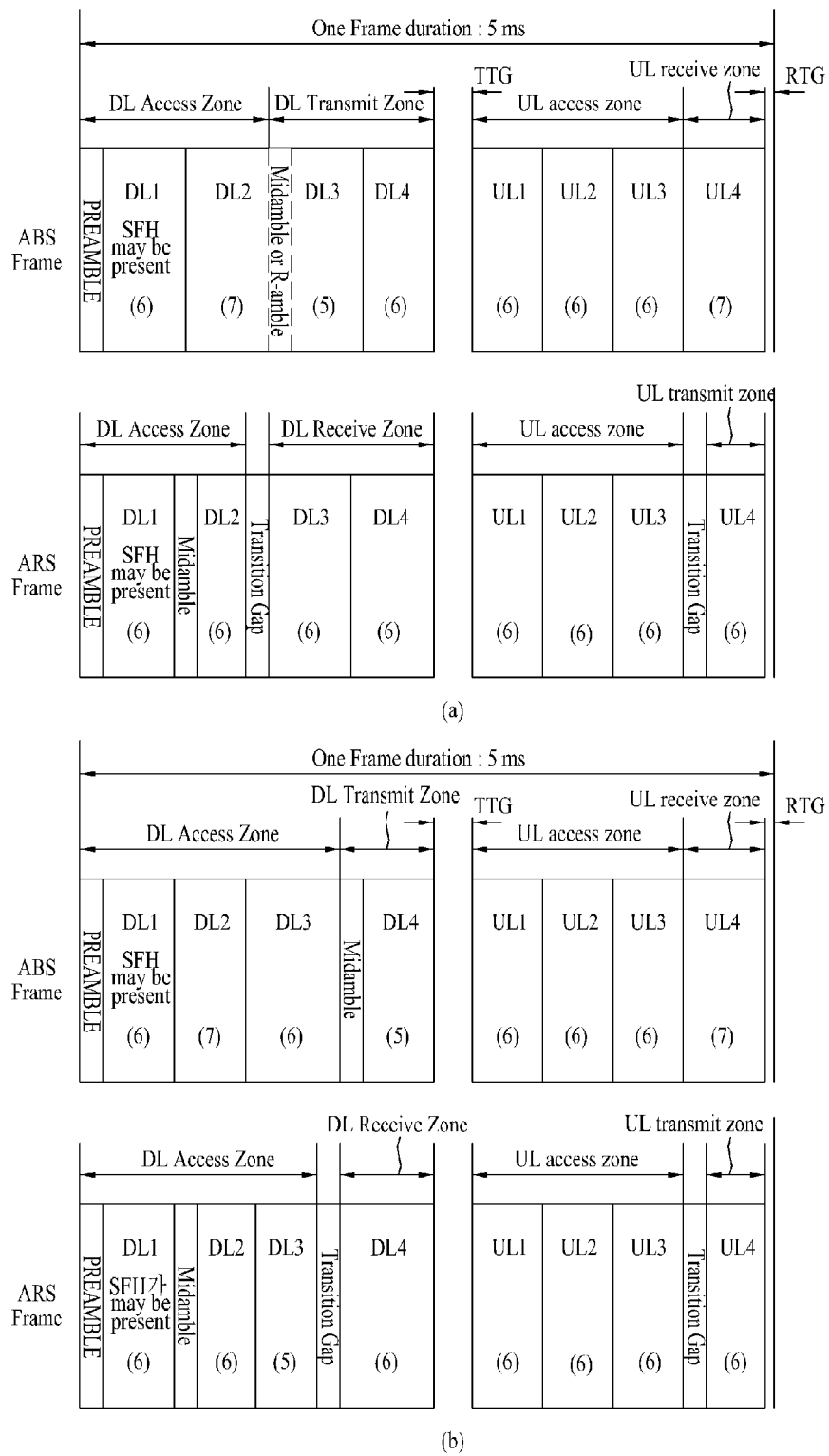
FIGS. 5(a) and 5(b) illustrate exemplary ABS and ARS frame structures having a downlink/uplink ratio of 4:4 and a Tb CP length of 1/16 for channel bandwidths of 5/10/20 MHz.

FIGS. 5(a) and 5(b) illustrate exemplary ABS and ARS frame structures having a downlink/uplink ratio of 4:4 and a Tb CP length of 1/16 for channel bandwidths of 5/10/20 MHz.

As shown in FIGS. 5(a) and 5(b), a BS can support an MS using a frame structure having a Tb CP length of 1/16. FIGS. 5(a) and 5(b) show a case in which the ratio of a DL access zone to a DL transmit zone (or DL receive zone) is 2:2 and 3:1, respectively. That is, the ratio of the number of subframes allocated to the DL access zone to the number of subframes allocated to the DL transmit zone (or DL receive zone) is 2:2 and 3:1. The BS can transmit a midamble using two methods to acquire channel information about an RS and an MS.

Referring to FIGS. 5(a) and 5(b), the BS can transmit a midamble using a subframe (DL3 or DL4) of the DL transmit zone for channel measurement of the MS and the RS. Here, while the location of the midamble in the subframe is not limited, the first symbol or the last symbol of the subframe may be preferable.

When the DL region is configured in the ratio of 2:2, the BS can transmit a midamble using a subframe (DL3 or DL4) of the DL transmit zone. The subframe carrying the midamble is Type-3 subframe in which one symbol has been reduced, as shown in FIG. 5(a).

Alternatively, when the BS respectively transmits midambles or R-ambles to the MS and the RS, the BS can transmit the midamble or R-amble for the RS through a subframe of the DL transmit zone using the above-mentioned method. The BS can transmit the midamble for the MS using the second subframe (Type-2 subframe DL2) of the DL access zone. Here, one symbol of the subframe DL2 is used for the midamble, and thus the subframe DL2 becomes Type-1 subframe. When the BS transmits the midambles or R-ambles to the MS and the RS using the aforementioned methods, the RS can transmit a midamble to the MS using the subframe DL2 allocated to the DL access zone. Here, a transition gap is also allocated to the subframe DL2. Accordingly, the subframe DL2 of the RS becomes Type-3 subframe since two symbols are allocated to the midamble and the transition gap. The locations of the midambles transmitted by the BS and the RS to the MS are different from each other, and thus midamble transmission needs not be signaled to the MS.

If the first subframe (subframe DL3) of the DL receive zone is allocated to the transition gap in the frame structure of the RS, the subframe DL2 carrying the midamble in the DL access zone of the frame structure of the RS is Type-1 subframe since only one symbol of the subframe DL2 is allocated to the midamble. In this case, the BS can transmit a midamble using the last symbol of the subframe DL3 or the first or last symbol of the subframe DL4 of the DL transmit zone. Here, the BS can transmit the midamble at a location (timing) other than the location of the transition gap in the frame structure of the RS.

Referring to FIG. 5(b), when the DL configuration ratio (that is, the ratio of the number of subframes allocated to the DL access zone to the number of subframes allocated to the DL transmit zone) is 3:1, the BS can transmit midambles or R-ambles to the MS and the RS through the same subframe or different subframes in order to acquire channel information, as described above. In the former case, the BS can transmit the midambles to the MS and the RS using subframe DL4 allocated to the DL transmit zone in the same position. Particularly, the BS can transmit the midambles using the first or last symbol of subframe DL4. Here, one symbol subtracted from the symbols of subframe DL4 and thus subframe DL4 becomes Type-3 subframe. In the latter case, when the BS respectively transmits midambles or R-ambles to the RS and the MS, the BS can transmit the midamble for the MS using subframe DL2 or DL3 allocated to the DL access zone. If the BS transmits the midamble to the MS using subframe DL2, subframe DL2 has Type-1 subframe format. If the BS transmits the midamble to the MS using subframe DL3, subframe DL3 has Type-3 subframe format.

The BS can transmit the midamble for the RS using subframe DL4 of the DL transmit zone in order to acquire channel state information about the RS. Here, the midamble can be present at the first or last symbol of subframe DL4. When the BS uses this frame structure, the RS can transmit a midamble to the MS using subframe DL2 allocated to the DL access zone thereof to acquire channel information about the MS. Subframe DL2 carrying the midamble has Type-1 subframe format because one symbol of subframe DL2 is allocated to the midamble. If the transition gap is allocated to subframe DL4 instead of subframe DL3 in the frame structure of the RS, the RS can transmit the midamble using subframe LD3 like the BS, and subframe DL3 has Type-3 subframe format consisting of 5 symbols. At this time, the midamble transmitted by the BS to the RS can be delivered using the last symbol of subframe DL4.

The BS and the RS can configure the UL zones thereof in the same ratio. The BS and the RS can configure the UL zones in the ratios of 1:3, 2:2 and 3:1. Specifically, the ratio of the number of subframes allocated to the UL access zone to the number of subframes allocated to the UL receive zone (or UL transmit zone) of the BS and the RS can be 1:3, 2:2 and 3:1. When the UL zone configuration ratio is 1:3 and 2:2, one symbol of a subframe can be allocated to a transition gap between UL zones in the frame structure of the RS. Accordingly, the subframe in which one symbol is allocated to the transition gap has Type-3 subframe format including 5 symbols when the UL zone configuration ratio is 1:3 and 2:2.

This subframe can be present in the UL access zone or the UL transmit zone of the RS. However, it is preferable that the subframe be located in the UL transmit zone because a UL control channel consists of 6 symbols. This is exemplary and the location of Type-3 subframe is not limited. Type-3 subframe including the transition gap can be used as a control channel in the UL transmit zone, used for only UL data transmission, or punctured. When the UL zone configuration ratio is 3:1, distinguished from the case in which the UL zone configuration ratio is 1:3 and 2:2, a subframe including the transition gap does not have Type-3 subframe format even though one symbol of the subframe is allocated to the transition gap because one subframe allocated to the UL transmit zone of the RS consists of 7 symbols. Accordingly, the RS can transmit a signal using the previously defined UL control channel.

FIGS. 6 and 7 illustrate exemplary ABS and ARS frame structures having a DL/UL ratio of 5:3 and Tb CP lengths of ⅛ and 1/16 for channel bandwidths of 5/10/20 MHz.

When a BS uses a DL/UL ration of 5:3, the BS and an RS can support DL zone configuration ratios of 2:3, 3:2 and 4:1 on the downlink and configure a UL access zone and a UL receive zone (or UL transmit zone) in the ratios of 2:1 and 1:2 to transmit a signal on the uplink. When transmission of a midamble or an R-amble for acquiring channel state information is considered in the DL region, the ratio of the number of subframes allocated to the DL access zone to the number of subframes allocated to the DL transmit zone (or DL receive zone) can be 3:2 or 2:3.

FIGS. 6 and 7 show frame structures of the BS and the RS, which have Tb CP lengths of ⅛ and 1/16 and include a DL access zone and a DL transmit zone (or DL receive zone) in the ratio of 3:2, respectively. The BS can transmit midambles or R-ambles to the MS and the RS using different zones in order to acquire channel information about the MS and the RS. Specifically, the BS can transmit a midamble for the MS using the second subframe DL2 of the DL access zone, as shown in FIGS. 6 and 7. When the RS allocates one symbol of the fourth subframe DL4 of the DL receive zone thereof to a transition gap, the BS can transmit the midamble or an R-amble using the third subframe DL3 of the DL region.

In addition, the BS can transmit a midamble for the RS using the first subframe (available for both Tb CP lengths of ⅛ and 1/16 in which the last symbol of subframe DL3 is allocated to the transition gap) or the second subframe (available only for 1/16 Tb CP length) of the DL transmit zone. One of symbols constituting the subframe of the BS, which carries the midamble, is reduced because one symbol of the subframe is allocated to the midamble. As shown in FIGS. 6 and 7, the subframe carrying the midamble of the BS has Type-3 subframe format or Type-1 subframe format. In addition, the subframe having a symbol allocated to the transition gap in the DL region has Type-3 subframe format or Type-1 subframe format.

Distinguished from the above-described method, the BS can transmit midambles to the MS and the RS using one subframe of the DL transmit zone. In this case, the BS can transmit the midambles using the aforementioned frame structure having a separate subframe for transmitting the midamble or R-amble to the RS.

When a Tb CP length of 1/16 is used, the BS and the RS can configure the DL access zone and the DL transmit zone by making the ratio (DL zone configuration ratio) of the number of subframes of the DL access zone to the number of subframes of the DL transmit zone be 4:1 to support the MS. In this case, the BS can transmit a midamble using the abovementioned method in which the DL zone configuration ratio is 3:2. Since subframe DL4 is additionally allocated to the DL access zone, both the BS and the RS can transmit the midambles for the MS using subframe DL4. The BS transmits the midamble for the RS using subframe DL5. Here, the midamble for the RS can be transmitted using the first or last symbol of subframe DL5. The location of the symbol corresponding to the midamble in the subframe is not limited.

In the UL region, the BS and the RS can transmit signals using UL zones in the UL zone configuration ratios of 1:2 and 2:1. Specifically, in the UL frame structures of the BS and the RS, the ratio of the number of subframes allocated to the UL access zone to the number of subframes allocated to the UL receive zone (or UL transmit zone) can be 1:2 and 2:1. The configuration and usage of UL subframes can correspond to those in the case of other DL/UL ratios.

In the case of DL/UL ratios of 3:5, 4:4 and 5:3, when the BS transmit midambles to the RS and the MS using the DL access zone and the DL transmit zone, respectively, the locations of midambles transmitted by the RS and the BS to the MS may be identical to or different from each other.

Figure 8:
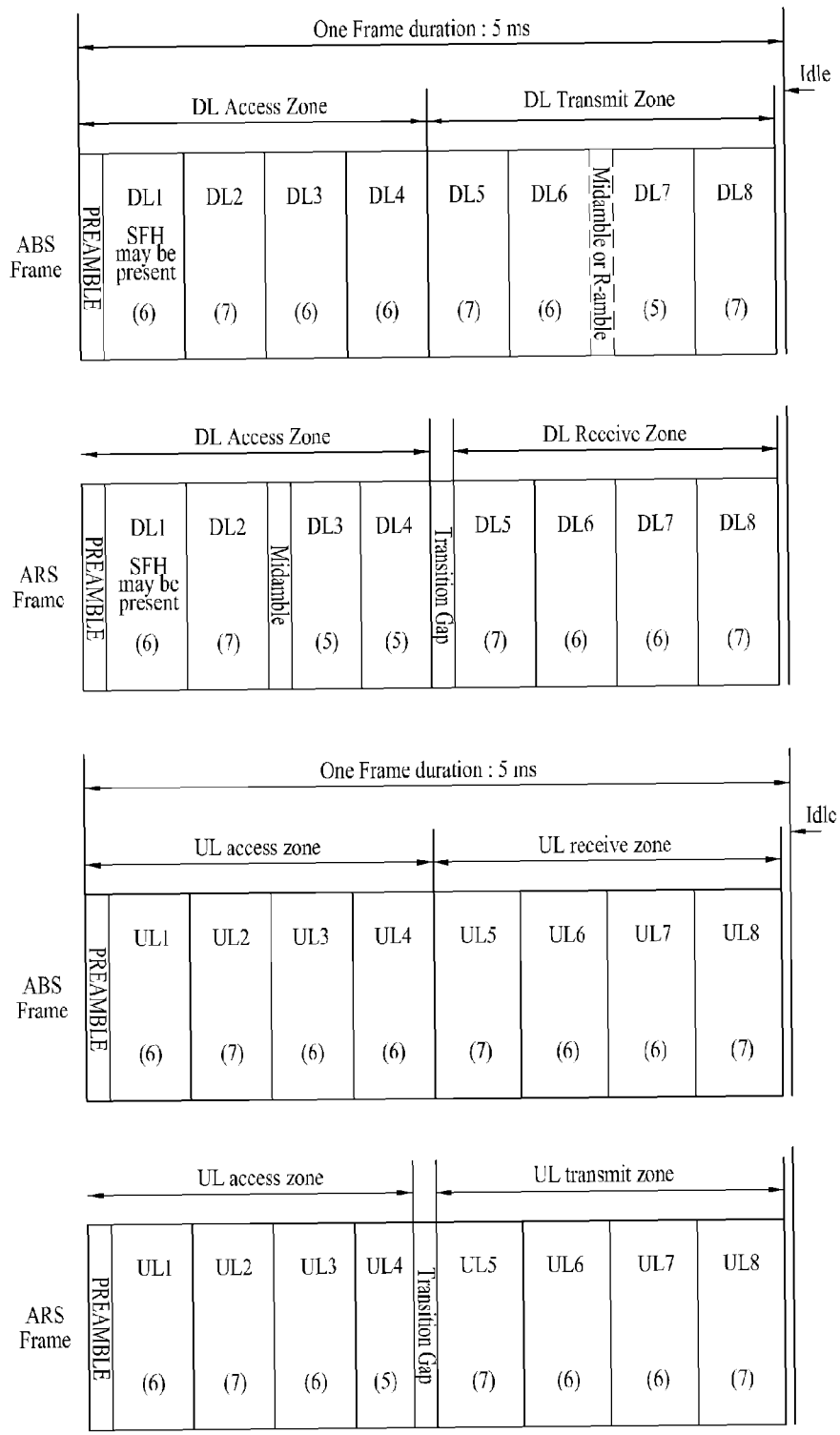
FIG. 8 illustrates exemplary ABS and ARS FDD frame structures having a Tb CP length of 1/16.

FIG. 8 illustrates exemplary ABS and ARS FDD frame structures having a Tb CP length of 1/16.

A DL region of a BS includes a DL access zone and a DL transmit zone and a UL region thereof includes a UL access zone and a UL receive zone. Here, while it is most desirable that the ratio of the number of subframes allocated to the DL access zone to the number of subframes allocated to the DL transmit zone and the ratio of the number of subframes allocated to the UL access zone to the number of subframes allocated to the UL receive zone be 1:1, other ratios can be used. The downlink and uplink have the same zone configuration. To acquire channel information between the BS and the MS or between the BS and the RS, the BS can transmit the same midamble to the MS and the RS using the DL transmit zone. In this case, the midamble can be transmitted using one of subframes DL5, DL6, DL7 and DL8 present in the DL transmit zone of the BS. When the BS transmits the midamble using subframe DL6 or DL7, the subframe DL6 or DL7 has Type-3 subframe format including 5 symbols. If the midamble is transmitted using subframe DL5 or DL8, subframe DL5 or DL8 has Type-1 subframe format having 6 symbols. At this time, the BS needs to transmit information on the location of the midamble through broadcast information or user specific information.

When the BS transmits midambles to the RS and the MS using subframes of the respective zones, the BS can transmit the midamble for the MS using one of subframes DL2, DL3 and DL4. The subframe carrying the midamble has Type-1 or Type-3 subframe format.

The frame structure of the RS requires a transition gap located between zones. Accordingly, a subframe including the transition gap has a one-symbol-reduced subframe format, as shown in FIG. 8. Specifically, the subframe including the transition gap has Type-3 or Type-1 subframe format according to the location of the transition gap. Type-3 subframe generated due to the transition gap in the UL region can be used only for data transmission or punctured.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. For example, an embodiment of the present invention may be constructed by combining components or configurations of the above-described embodiments of the present invention. Accordingly, the invention should not be limited to the specific embodiments described herein, but should be accorded the broadest scope consistent with the principles and novel features disclosed herein.

The exemplary embodiments of the present invention may be achieved by various means, for example, hardware, firmware, software, or a combination thereof. In a hardware configuration, the exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the exemplary embodiment of the present invention may be achieved by a module, a procedure, a function, etc. performing the above-described functions or operations. Software code may be stored in a memory unit and executed by a processor. The memory unit is located at the interior or exterior of the processor and may transmit data to and receive data from the processor via various known means.

The present invention may be carried out in other specific ways without departing from the spirit and essential characteristics of the present invention. The above detailed description is therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, claims that are not explicitly cited in the appended claims may be presented in combination as an exemplary embodiment of the present invention or included as a new claim by subsequent amendment after the application is filed.

INDUSTRIAL APPLICABILITY

The method and apparatus for transmitting/receiving a signal using a predetermined TDD frame structure can be applied to wireless communication systems such as IEEE 802.16, 3GPP LTE, LTE-A, etc.

What is claimed is:

1. A method for transceiving signals using a predetermined time division duplex (TDD) frame in a wireless communication system the method comprising,
- transmitting, a first midamble by a base station (BS) to a mobile station (MS); and
- transmitting a second midamble by the BS to a relay station (RS),
- wherein the first midamble is transmitted through a downlink access zone of the BS,
- wherein the second midamble is transmitted through a downlink relay zone of a specific frame of each superframe,
- wherein the second midamble is transmitted through a last symbol of a first non-type-3 subframe of the downlink relay zone counting from an end of a downlink zone of the specific frame, and
- wherein a channel bandwidth of the TDD frame is either 5 MHz, 10 MH or 20 MHz.

2. The method according to claim 1, wherein a CP (Cyclic Prefix) length of each symbol corresponds to $\frac{1}{16}$ or $\frac{1}{8}$ of an effective symbol length in the TDD frame.

3. A base station (BS) configured to transceive signals using a predetermined TDD frame in a wireless communication system, the BS comprising:
- a transmitter configured to transmit a first midamble to a mobile station (MS) and transmit a second midamble to a relay station (RS),
- wherein the first midamble is transmitted through a downlink access zone of the BS,
- wherein the second midamble is transmitted through a downlink relay zone of a specific frame of each superframe,
- wherein the second midamble is transmitted through a last symbol of a first non-type 3 subframe of the downlink relay zone counting from an end of a downlink zone of the specific frame, and
- wherein a channel bandwidth of the TDD frame is either 5 MHz, 10 MH or 20 MHz.

4. The BS according to claim 3, wherein a CP (Cyclic Prefix) length of each symbol corresponds to $\frac{1}{16}$ or $\frac{1}{8}$ of an effective symbol length in the TDD frame.

5. A method for transceiving signals using a time division duplex (TDD) frame of the RS in a wireless communication system, the method comprising,
- transmitting a first midamble by a relay station (RS) to a mobile station (MS); and
- receiving a second midamble by the RS from a base station (BS),
- wherein the first midamble is transmitted through a downlink access zone of the RS,
- wherein the second midamble is received through a downlink relay zone of a specific frame of each superframe,
- wherein the second midamble is received through a last symbol of a first non-type-3 subframe of the downlink relay zone counting from an end of a downlink zone of the specific frame, and
- wherein a channel bandwidth of the TDD frame is either 5 MHz, 10 MH or 20 MHz.

6. The method according to claim 5, wherein a CP (Cyclic Prefix) length of each symbol corresponds to $\frac{1}{16}$ or $\frac{1}{8}$ of an effective symbol length in the TDD frame.

7. A relay station (RS) for transceiving signals using a time division duplex (TDD) frame of the RS in a wireless communication system, the RS comprising,
- a transmitter configured to transmit a first midamble to a mobile station (MS); and
- a receiver configured to receive a second midamble from a base station (BS),
- wherein the first midamble is transmitted through a downlink access zone of the RS,
- wherein the second midamble is received through a downlink relay zone of a specific frame of each superframe,
- wherein the second midamble is received through a last symbol of a first non-type-3 subframe of the downlink relay zone counting from an end of a downlink zone of the specific frame, and
- wherein a channel bandwidth of the TDD frame is either 5 MHz, 10 MH or 20 MHz.

8. The RS according to claim 7, wherein a CP (Cyclic Prefix) length of each symbol corresponds to $\frac{1}{16}$ or $\frac{1}{8}$ of an effective symbol length in the TDD frame.

* * * * *